July 31, 1945.     L. D'URBANO.     2,380,638
DEVICE ADAPTED FOR DETACHABLY COUPLING TO
EYEGLASSES FOR PROTECTING THE LENSES
Filed April 5, 1944
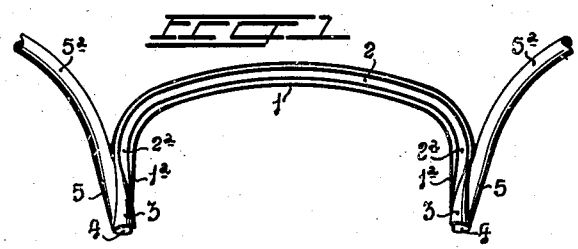
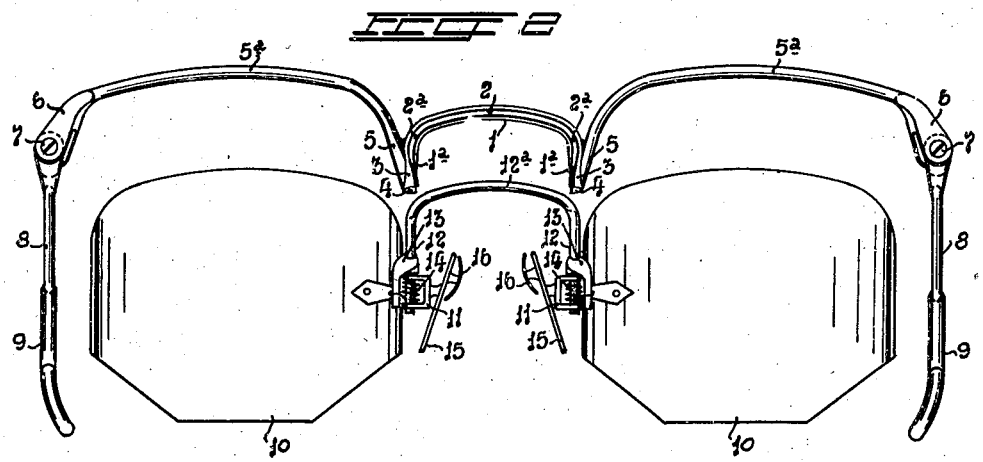
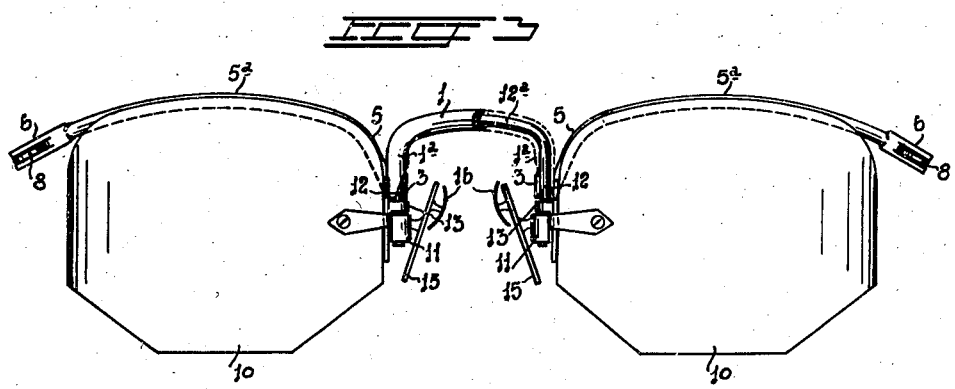
Inventor:
Luis D'Urbano
by
Singer, Ehlert, Stern & Carlberg
Attorneys Patented July 31, 1945

2,380,638

UNITED STATES PATENT OFFICE 2,380,638

DEVICE ADAPTED FOR DETACHABLY COUPLING TO EYEGLASSES FOR PROTECTING THE LENSES

Luis D'Urbano, Buenos Aires, Argentina

Application April 5, 1944, Serial No. 529,654
In Argentina January 26, 1944

5 Claims. (Cl. 88—41)

The present invention relates to a device adapted to be detachably coupled to rimless eyeglass mountings having no temple bars, (pincenez), comprising a structure which operates as a safety means against vibration of the lenses caused by any number of reasons, the principal one being the impact of the wind against the lenses.

The device in itself consists of a central bridge member adjustable by pressure to the bridge mounting of the conventional eyeglasses. The central bridge member has attached on either side of its lateral branches, an arch member constituting the protecting element for the lenses against vibration, the lenses being yieldingly urged against said arch members, which thereby act as shock absorber against any vibratory movement of the lenses caused by the impact of the wind or whatever other causes may be capable of doing so, thus eliminating the danger of the lenses hitting the face of the wearer adjacent to the eyes.

Another object of the invention is to convert ordinary eyeglasses having no temple bows or curved supports passing over the ears, so called pincenez, into spectacles, which is the conventional description given to eyeglasses having temple bows. By this is meant that by means of the device to which the present invention is related, it becomes unnecessary for the user to carry two different types of optical devices, such as eyeglasses and spectacles, just one of such devices being sufficient having attached thereon a corresponding coupling device which is adapted to transform at any time ordinary eyeglasses into spectacles. It is therefore unnecessary for the user to carry two different envelopes or cases, one for eyeglasses and another for spectacles, because the set formed by the eyeglasses and the coupling device of the present invention is easily fitted in just one ordinary envelope or case.

Other objects and advantages of the present invention will appear from the following description taken with reference to the accompanying drawing, in which Fig. 1 represents an elevation view, partially showing the front of the device, on an enlarged scale;

Fig. 2 represents an elevation view, showing the device in coupling arrangement with ordinary eyeglasses, when viewed from the rear; and Fig. 3 represents an elevation view, showing the front of the eyeglasses with the novel coupling device attached thereto.

With reference to the details of the drawing, the device of the present invention comprises a central bridge member 1 terminating in two toggled lateral branches 1ª. This central bridge member is provided with a groove 2 which extends without interruption to the end of the lateral branches 1ª. The two extensions 2ª of the groove 2 are partially closed in the mid inferior portion of the two lateral branches 1ª by a wing portion 3 turning against the inner edge of the corresponding lateral branch, thus substantially forming a lower nozzle 4 which acts as a pressure adjusting zone for the detachable bridge member against the bridge piece of the eyeglasses.

The lateral branches 1ª have attached to their outer side, as by welding the mid inferior portion of the toggled terminals or branches 5 of arched bars 5ª. The arched bars 5ª constitute the protecting means for the lenses against vibration, in the manner hereinafter described.

The outer ends of the arched bars 5ª are each provided with a forked terminal 6, as it is shown in Figs. 2 and 3. These forked terminals have articulated connections with the ends of corresponding temple bars 8 by means of corresponding pins 7. Said temple bars 8 terminate in bows 9 for securing the device to the ears of the wearer, in the usual manner.

The provision of the temple bows 8, 9 and forked terminals 6 in the device is only optional, inasmuch as the fundamental object of the device of the present invention is to protect the lenses against vibration. For that reason these parts may be omitted, and if such be the case, the length of the arched bars 5ª will be calculated so as to have the extreme end of the bars 5ª, when applied to rimless eyeglasses, coinciding with the outer lateral edge of the lenses, the eyeglasses retaining thereby their original mode of application, because they cannot be used in the conventional manner as spectacles provided with temple bows.

The device described is adapted, according to these specifications, to be detachably coupled to ordinary rimless eyeglasses, such as the ones shown in Figs. 2 and 3. Fig. 2 is a view showing the eyeglasses from the rear, having the lenses 10 secured with their inner lateral edge to strap elements fixed to brackets 11. These brackets 11 are pivotally mounted on the lower ends of lateral branches 12 of the bridge piece 12ª which together with said lateral branches 12 and bushings 13, which latter are rigidly attached to the approximate middle portion of the lateral branches, constitute the mounting member for the lenses 10. The horizontal oscillating movement of the lenses is controlled by springs 14 mounted on the lower ends of the branches 12 and located between the spaced upper and lower toggled branches of the brackets 11, said brackets being of the conventional grooved type and carrying on the lateral internal edge of their vertical portions, corresponding rods 15 with nose engaging pads 16 for clamping the eyeglasses to the nose of the wearer. The coupling of the device of the invention to the lens mounting member 12ª takes place in the following manner:

As illustrated in Fig. 2, the central bridge member 1 of the invention is placed above the bridge piece 12ᵃ of the conventional eyeglasses with the lateral branches 12 engaging the groove 2ᵃ of the lateral branches 1ᵃ of the bridge member 1. A slight downward pressure on the bridge member 1 will cause the lateral branches 12 of the bridge piece 12ᵃ to slip into position, with the bridge piece 12ᵃ entering the groove 2 of the bridge member 1. As a result of this construction said central bridge member 1 and lateral branches 1ᵃ form a perfect fit with the bridge piece 12ᵃ and lateral branches 12 inserted in groove 2 and extension of the same, 2ᵃ, with the lower edges of lateral branches 1ᵃ resting against the top end of the bushings 13. The whole construction presents the appearance shown in Fig. 3, with the bridge of the eyeglasses totally concealed by the bridge member 1 of the device of the invention, giving the impression of forming a single unit although composed of two individual elements. It will be noted, that the arched bars 5ᵃ extend outwardly behind and along the upper marginal portions of the lenses of the eyeglasses, the same being curved to conform to the peripheral contour of the upper edge of the said lenses. The adherence between the bridge member 1, 1ᵃ and the bridge piece 12 is performed by the wing portions 3 forming the nozzle 4, said wing portions 3 virtually surrounding the lateral contour of the branches 12 and avoid any danger of a sudden detachment of the device of the invention from the bridge piece of the eyeglasses.

By coupling the device of the invention to the eyeglasses in the manner described, the arched bars 5ᵃ form shock absorbing elements for the lenses 10 in that they absorb vibration. According to Fig. 3, the lenses, owing to their horizontal oscillating movement, tend to rest with their upper edge against said arched bars as a result of the pressure of the springs 14.

Whenever it is desired to reconvert the spectacles thus formed into a pair of ordinary unprotected eyeglasses, it is only necessary to draw up the central bridge member 1, until it has become separated from the bridge piece 12ᵃ and the lateral branches 12 of the same.

This description, as well as the representations of the accompanying drawing, are merely demonstrations of a preferred embodiment of the invention by way of example only. By this is meant that other modifications in the details of the assembly constituting the device may be included, without in any way departing from the scope of the invention.

What I claim is:

1. A device of the character described, comprising a central bridge member having two lateral branches, said central bridge member and said two branches being provided with a continuous groove extending along their inner sides adapted to receive and hold therein detachably the bridge piece and the lateral branches thereof of a rimless eyeglass mounting, and two arched bars extending outwardly from the two lateral branches of said central bridge member, said two arched bars being curved to conform to the peripheral contour of the upper edge of the lenses of the eyeglasses to which the device is adapted to be attached and when attached being positioned behind the upper marginal portions of said lenses.

2. A device of the character described, comprising a central bridge member having two lateral branches, said central bridge member and said two branches being provided with a continuous groove extending along their inner sides adapted to receive and hold therein detachably the bridge piece and the lateral branches thereof of a rimless eyeglass mounting, a wing shaped portion at the lower end of each lateral branch of said central bridge member curved toward the inner side of the same and partly closing said groove and for engaging with adjustable pressure the lateral branch of said bridge piece, and two arched bars extending outwardly from the two lateral branches of said central bridge member, said two arched bars being curved to conform to the peripheral contour of the upper edge of the lenses of the eyeglasses to which the device is adapted to be attached and when attached being positioned behind the upper marginal portions of said lenses.

3. A device of the character described, comprising a central bridge member having two lateral branches and provided with a groove along its inner side continuing into said lateral branches, said groove being provided for detachably receiving and holding therein the bridge piece and the lateral branches thereof of a rimless eyeglass mounting, two arched bars extending outwardly from the two lateral branches of said central bridge member, and two temple bars pivotally attached to the outer ends of said arched bars, said two arched bars being curved to conform to the peripheral contour of the upper edge of the lenses of the eyeglasses to which the device is adapted to be attached and when attached being positioned behind the upper marginal portions of said lenses.

4. A device of the character described, comprising a central bridge member having two lateral branches and provided with a groove along its inner side continuing into said lateral branches, said groove being provided for detachably receiving and holding therein the bridge piece and the lateral branches thereof of a rimless eyeglass mounting, a wing shaped portion at the lower end of each lateral branch of said central bridge member curved toward the inner side of the same and partly closing said groove and for engaging with adjustable pressure the lateral branch of said bridge piece, two arched bars extending outwardly from the two lateral branches of said central bridge member, and two temple bars pivotally attached to the outer ends of said arched bars, said two arched bars being curved to conform to the peripheral contour of the upper edge of the lenses of the eyeglasses to which the device is adapted to be attached and when attached being positioned behind the upper marginal portions of said lenses.

5. A rimless spectacle frame adapted for detachably coupling to rimless eyeglass mountings of the pincenez type, comprising a central bridge member having two lateral branches and provided with means for detachably embracing and holding the bridge piece of a rimless eyeglass mounting, two arched bars extending outwardly from the two lateral branches of said central bridge member, and two temple bars pivotally attached to the outer ends of said arched bars, said two arched bars being curved to conform to the peripheral contour of the upper edge of the lenses of the eyeglasses to which the device is adapted to be attached and when attached being positioned behind the upper marginal portions of said lenses.

LUIS D'URBANO.